(12) United States Patent
Pescod et al.

(10) Patent No.: US 8,843,084 B2
(45) Date of Patent: Sep. 23, 2014

(54) ANTENNA DIVERSITY APPARATUS

(75) Inventors: Christopher Ralph Pescod, Chelmsford (GB); James Christopher Gordon Matthews, Bury St Edmunds (GB); Andrew James Smith, Colchester (GB)

(73) Assignee: BAE SYSTEMS plc, London (GB)

( * ) Notice: Subject to any disclaimer, the term of this patent is extended or adjusted under 35 U.S.C. 154(b) by 126 days.

(21) Appl. No.: 13/576,325

(22) PCT Filed: Jan. 31, 2011

(86) PCT No.: PCT/GB2011/050149
§ 371 (c)(1),
(2), (4) Date: Jul. 31, 2012

(87) PCT Pub. No.: WO2011/095796
PCT Pub. Date: Aug. 11, 2011

(65) Prior Publication Data
US 2012/0302183 A1 Nov. 29, 2012

(30) Foreign Application Priority Data

Feb. 3, 2010 (EP) .................................... 10275011
Feb. 3, 2010 (GB) .................................. 1001741.6

(51) Int. Cl.
| | |
|---|---|
| H04B 1/44 | (2006.01) |
| H01Q 1/27 | (2006.01) |
| H04B 7/08 | (2006.01) |
| H04B 1/38 | (2006.01) |
| H04W 76/00 | (2009.01) |
| H04B 7/06 | (2006.01) |
| H01Q 21/28 | (2006.01) |

(52) U.S. Cl.
CPC ............. *H04B 7/0608* (2013.01); *H01Q 1/273* (2013.01); *H04B 7/082* (2013.01); *H04B 1/385* (2013.01); *H04W 76/005* (2013.01); *H01Q 21/28* (2013.01)

USPC ................ 455/78; 455/66.1; 455/73; 455/83; 455/87; 455/101

(58) Field of Classification Search
CPC ....... H04B 1/385; H04B 7/0608; H04B 7/082
USPC ........ 455/513, 66.1, 73, 78, 83, 87, 101, 134, 455/269
See application file for complete search history.

(56) References Cited

U.S. PATENT DOCUMENTS

| | | | |
|---|---|---|---|
| 5,809,405 | A | 9/1998 | Yamaura |
| 6,546,259 | B1 | 4/2003 | Vendryes |

(Continued)

FOREIGN PATENT DOCUMENTS

| | | |
|---|---|---|
| EP | 1 696 579 A1 | 8/2006 |
| JP | 2002-185396 A | 6/2002 |

(Continued)

OTHER PUBLICATIONS

XP-002620308, Octane Wireless, WLAN Wearable Antenna, PRR Wearable Antenna.

(Continued)

*Primary Examiner* — Tuan Pham
(74) *Attorney, Agent, or Firm* — Scully, Scott, Murphy & Presser, P.C.

(57) ABSTRACT

Apparatus for providing antenna diversity for a radio transmitter/receiver (TR) comprising measuring means for measuring relative received signal strengths in a plurality of antennas in a selectable frequency range, means for selecting the selectable frequency range according to a transmission frequency of the TR, and connecting means for connecting the antenna having the greatest received signal strength to the TR. The apparatus may be combined with a plurality of antennas to form a diversity antenna system, for example for use with a personal radio. The antennas may then be disposed spaced apart on the user's body e.g. by being incorporated into a garment.

15 Claims, 3 Drawing Sheets

(56) References Cited

U.S. PATENT DOCUMENTS

Figure 1:
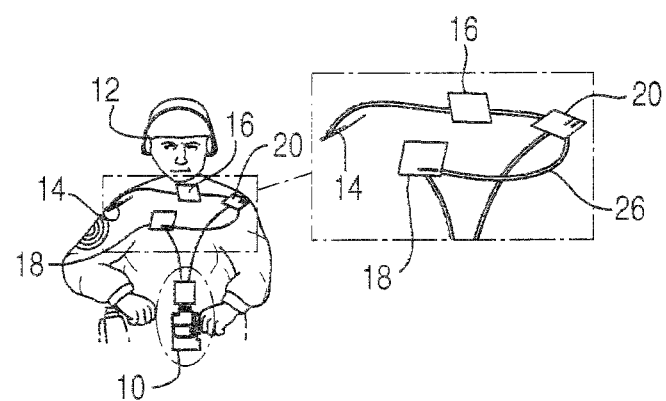

| | | | |
|---|---|---|---|
| 2001/0024949 A1* | 9/2001 | Yanagida et al. | 455/404 |
| 2005/0020302 A1 | 1/2005 | Ikeda et al. | |
| 2005/0185707 A1 | 8/2005 | Hoo et al. | |
| 2007/0225039 A1* | 9/2007 | Friday et al. | 455/560 |
| 2008/0204338 A1* | 8/2008 | Rofougaran | 343/751 |

FOREIGN PATENT DOCUMENTS

| | | |
|---|---|---|
| JP | 2005-217590 A | 8/2005 |
| WO | WO 2008/008658 A2 | 1/2008 |

OTHER PUBLICATIONS

Partial European Search Report dated Jul. 26, 2010 issued in EP 10275011.4.

UK Search Report dated Apr. 30, 2010 issued in GB1001741.6.

* cited by examiner

ANTENNA DIVERSITY APPARATUS

This invention relates to antenna diversity apparatus, and to antenna diversity systems. It is particularly (but not exclusively) applicable to personal radio transmitter/receivers, for example as carried by teams of people deployed together in a common task. Examples are fire fighters, and persons engaged in rescue in large natural disasters such as earthquakes.

Good quality voice communication by radio is essential between the members of such teams. Reliable, robust personal communications in urban surroundings is particularly challenging to achieve. The radios must operate in a difficult propagation environment, with reflections from walls producing multipath signals. In addition to this, personal equipment is worn on the body, so effects due to the proximity to the body and dynamic nature of the body (both moving around and changing shape) create a complex propagation environment which is detrimental to the performance of the radio system. Typically, the dynamic nature of the body and its surroundings is at its worst in situations when the communications channel is needed the most.

A current personal communications equipment has a short antenna which is attached to the radio casing and therefore is worn on one side of the body, close to the wearer. Although the radio was designed to be worn on the shoulder with the antenna protruding above the shoulder, it is not usually worn like this. The radio is worn on the chest and, to make it more comfortable to wear and operate the controls, it is often worn with the antenna placed horizontally.

The proximity to the body causes blockage of the radio signal which can be sufficiently bad to force the user to turn and face the person they wish to communicate with. If the user is forced to lie down or push up against a building, again the antenna will not perform well. A horizontally orientated antenna will receive around 1% of the power received by the vertically orientated antenna (if the transmit antenna is vertical).

One aspect of the present invention addresses this problem by providing a wearable antenna system for use with a personal radio transmitter/receiver, comprising a plurality of antennas flexibly connected to a common connector means so as to be capable in use of being disposed at different spaced-apart locations on the wearer's body, the common connector means being configured for connecting the antennas to the transmitter/receiver.

Thereby, the probability of one or more of the antennas being in a satisfactory propagation environment is improved, enabling satisfactory communication to be more likely achieved.

In its simplest form, the antennas are connectable to the radio via a splitter/combiner, but a further improvement in performance may be achieved by incorporating into the connecting means a diversity means for selecting the antenna which has the greatest received signal strength at the transmitter/receiver's reception frequency and for connecting it to the transmitter/receiver.

Whilst preferably the antennas are incorporated (e.g. as conformal antennas) into a garment to be worn by the user, they may alternatively be constrained to their spaced-apart positions by a simple harness arrangement or by housing them in other equipment worn by the user. Alternatively, the user may be allowed discretion as to where to place the antennas e.g. by distributing them in suitable pockets of his garment.

The particular prior art radio equipment discussed above is a multi-channel system in which the radio transmits and receives at the same frequency on one of a number of user-selectable channels of different frequency. The antennas must be effective for all channels of the radio, and thus in use will receive many signals on channels other than the one for which the radio is set, these signals being from or intended for other radios. The strongest of these signals may not be on the channel to which the radio is set, and therefore it is necessary that the diversity means measures the strength only of those signals on the user-selected frequency channel.

Thus, a second aspect of the invention provides antenna diversity apparatus for a radio transmitter/receiver comprising measuring means for measuring relative received signal strengths in a plurality of antennas in a selectable frequency range, means for selecting the selectable frequency range according to a transmission frequency of the transmitter/receiver, and connecting means for connecting the antenna having the greatest received signal strength to the transmitter/receiver. The selecting means may be a manual switch which is set to the same channel as that to which the transmitter/receiver is set, but a preferred arrangement is one in which the selecting means comprises means for detecting the frequency of a signal transmitted by the transmitter/receiver.

The particular prior art radio equipment discussed above is a simplex (half-duplex) system, i.e. one in which transmission and reception cannot take place simultaneously. It therefore incorporates a press-to-talk switch which the user operates when he wishes to initiate transmission.

The detecting means thus may be configured to detect the frequency of the transmitted signal when a press-to-talk switch or other transmission initiation switch of the transmitter/receiver is operated, or otherwise upon commencement of transmission by the transmitter/receiver.

It will be appreciated that the apparatus may also be used with other radio equipment in which transmission and reception use the same frequency, for example time-division duplex equipment in which transmission and reception are time-division multiplexed on the same carrier frequency.

The apparatus of this aspect of the invention may also be used with radio equipment having a plurality of selectable channels and in which transmission and reception are at different frequencies, provided that there is a defined relationship between those frequencies. Then the selecting means may be configured such that when it detects the transmission frequency it sets the measuring means to measure the relative received signal strengths at the associated reception frequency. Thus the invention may be used with full duplex radio equipment.

The measuring means may comprise a tunable filter means and control means responsive to the detecting means for setting the tunable filter means to pass signals received by each antenna in a frequency range determined by the detected transmission frequency.

In an alternative embodiment, the measuring means may comprise tunable down-converter means and control means responsive to the detecting means for setting the down-converter means to down-convert to a common lower frequency signals received by each antenna in a frequency range determined by the detected transmission frequency.

The tunable down-converter means may comprise means for providing a common local oscillator signal for down-converting the received signal samples from all of the antennas.

The measuring means may comprise a comparator for comparing the strengths of the passed or down-converted received signals, for determining which is the greatest, and for providing an instruction to the connecting means as to which antenna is to be connected to the transmitter/receiver.

When the transmitter/receiver transmits and receives on the same frequency, the apparatus may comprise means for down-converting a sample of the transmitted signal and samples of the received signals using a common local oscillator.

The invention also provides a diversity system comprising a plurality of antennas in combination with apparatus as set forth above.

The system or apparatus of all aspects of the invention preferably is configured so that it is separate from the transmitter/receiver (e.g. packaged as a separate module), and can be connected to an antenna port thereof. Thus it can be provided as a retrofit kit for existing transmitter/receivers: all that is necessary then is to remove the existing antenna of the equipment and connect the apparatus or system of the invention in its place.

The apparatus of the second aspect of the invention is not limited to use with personal radio equipment. Thus the plurality of antennas may be arranged in spaced-apart locations on a land, sea, or air vehicle or on a fixed platform which may suffer from an adverse or changing radio propagation environment.

Figure 2:
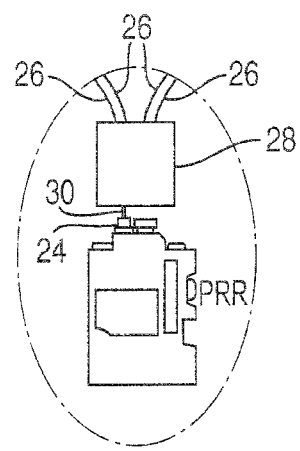
Figure 3:
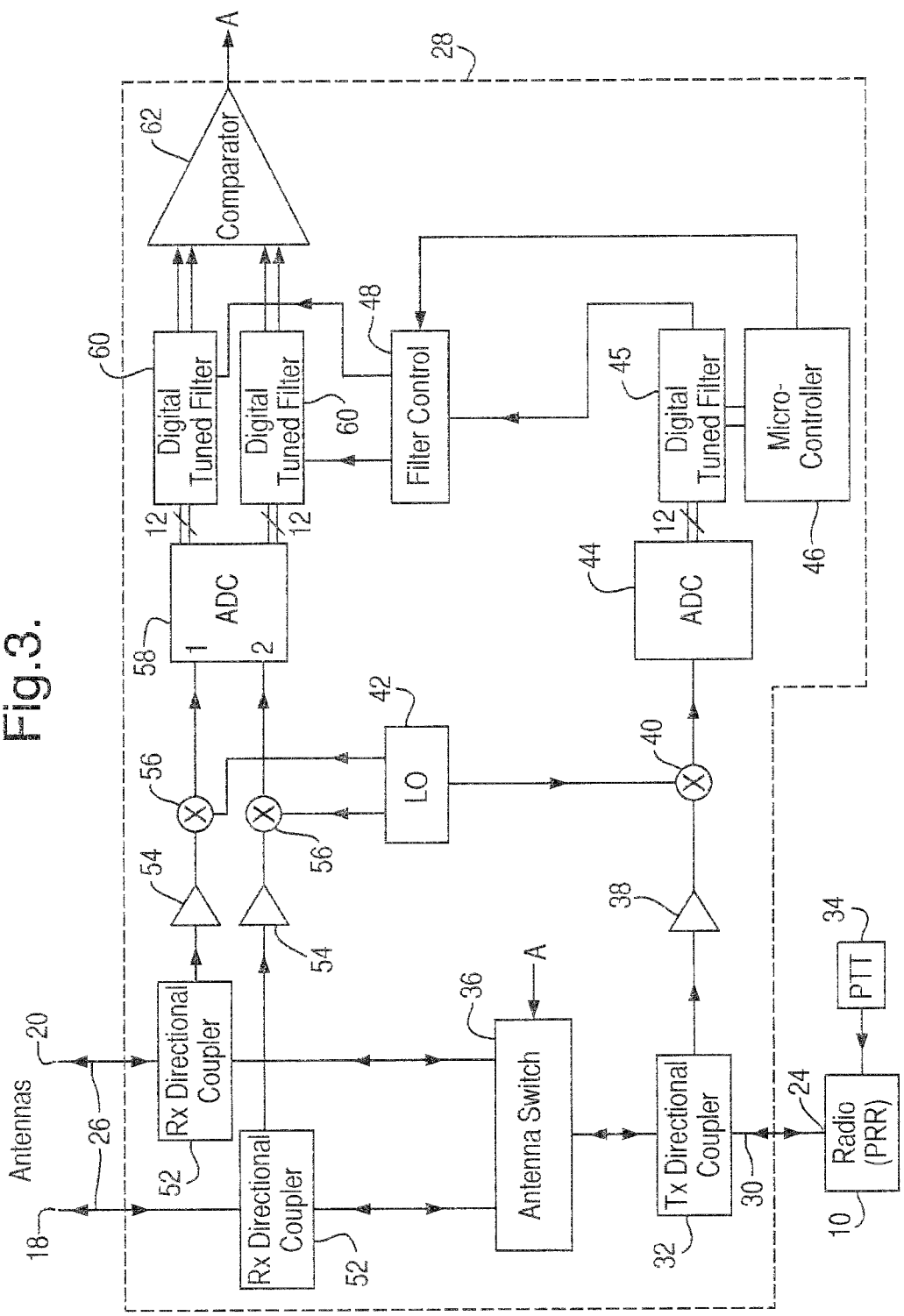
Figure 4:
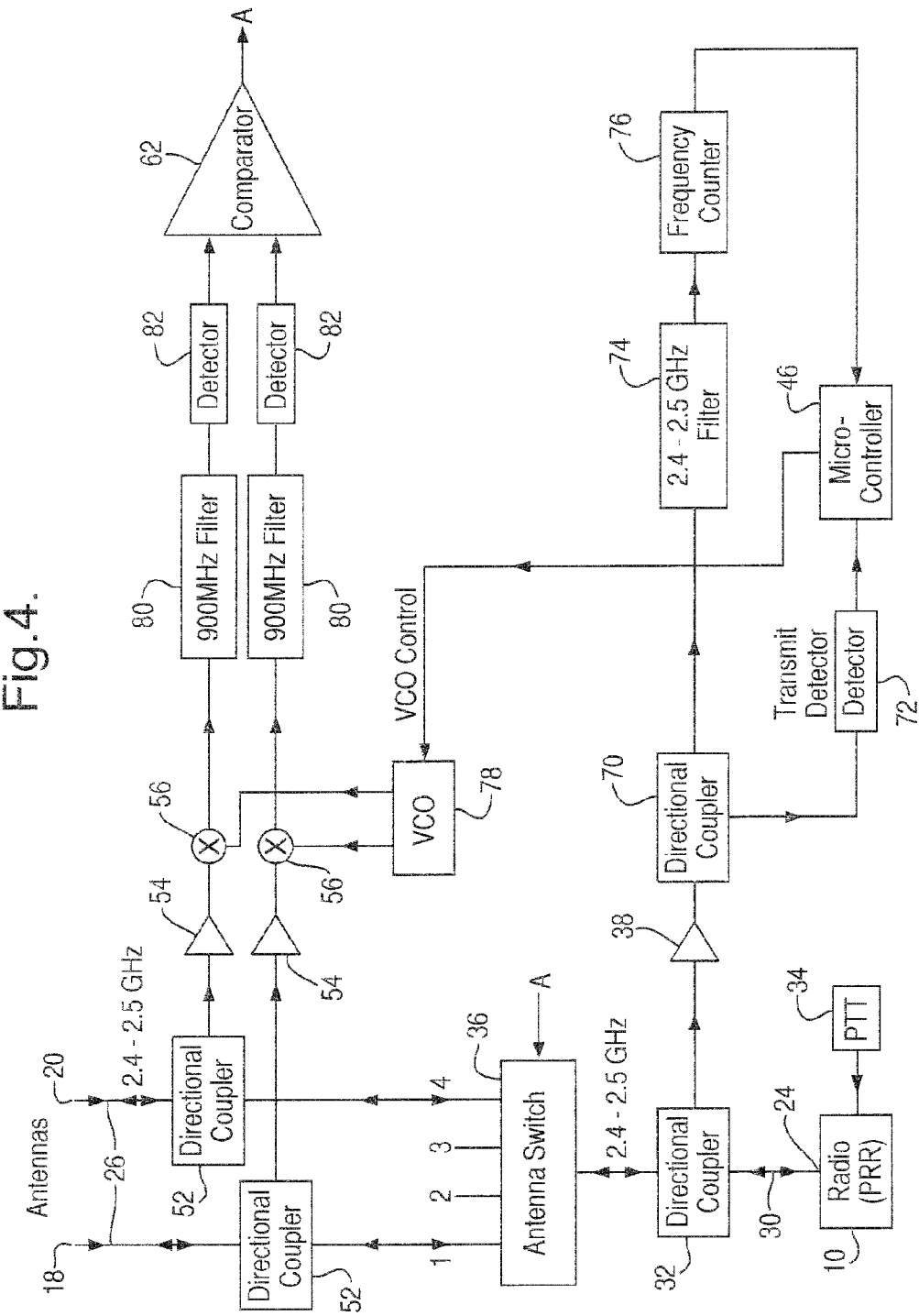

The invention will now be described merely by way of example with reference to the accompanying drawings, wherein FIG. 1 shows a personal radio transmitter/receiver connected to an antenna system according to the invention, and worn by a user, FIG. 2 is an enlarged view of part of FIG. 1, showing a modification, FIG. 3 shows a functional diagram of part of the antenna system of FIG. 2, and FIG. 4 shows an alternative embodiment to that of FIG. 3.

Referring to FIG. 1, a user is shown equipped with a personal transmitter/receiver 10 (here a transceiver) to which is connected a headset 12 comprising earphones and a microphone and an array of four antennas located one 14 on his right arm, one 16 on his back (but shown in the figure for clarity), one 18 on his chest and one 20 on his left shoulder The antennas can be of any convenient type, preferably conformal, for example patch, bow-tie, spiral or inverted F.

The multiple body-worn antennas 14, 16, 18, 20 are connected by bundled flexible coaxial leads 26 to a splitter/combiner and thence via a single co axial cable 30 (FIG. 2) to an antenna port 24 of the transceiver 10 to which in the prior art system a whip antenna would be connected. In practice the coaxial cable 30 will be longer than shown in FIG. 2, or alternatively, the splitter combiner may be directly plugged into the antenna port 24.

In operation, outgoing signals are transmitted from all four antennas, and incoming signals are received to a greater or lesser extent by all four antennas. In adverse radio propagation conditions there is a good probability that one or more of the antennas will be facing towards the source of the incoming signal, and will receive it at good signal strength. Possible interference may arise due to multipathing e.g. if one antenna receives a line-of-sight signal and another receives a non-line-of-sight signal. The use of COFDM modulation can minimise the effect of this multipath interference.

The antennas may be sewn into or otherwise secured to a garment worn by the user. Alternatively he may distribute them amongst pockets of his garments, or they may be supported spaced-apart by webbing or a similar harness, or carrier on other equipment worn by the user.

The device 28 either is a passive splitter/combiner or, in the most preferred embodiment of the invention, is an active diversity apparatus which selects the antenna which has the greatest received signal strength. This has the advantage firstly that possible interference between signals received by different ones of the antennas is avoided and secondly that all the transmitted signal is routed through the selected antenna. None of the transmitted signal power then is wasted through being directed to an antenna which is experiencing relatively poor propagation conditions.

An example of the diversity apparatus 28 is shown in FIG. 3. For simplicity it is shown as connected to two antennas, but it will be appreciated that four antennas may be employed as in FIG. 1, or three or a larger number, depending on the circumstances. In particular a larger number may be employed in embodiments of the invention for use in vehicles or other platforms rather than with personal radio equipment. Parts already described have the same reference numerals as in FIGS. 1 and 2.

The transmitter/receiver 10 is a simplex (half-duplex) apparatus capable of operating on many different frequency channels. The channels may be arranged in groups, and the channel group may be selected manually at the same time as the channel is selected on the radio, before commencement of an operation. There are a substantial number of different channels within the selected group, and the user selects which one to use in the field. Whilst it is possible for the user also to set or re-set the diversity apparatus manually to the required channel (e.g. by means of a manual switch), it is better if the user is relieved if this task. For this it is necessary for the diversity apparatus to determine which channel the radio 10 is using to transmit and receive.

The apparatus 28 therefore comprises a transmission directional coupler 32 which receives a transmission signal via connection 30 each time a press to talk (PTT) switch 34 of the radio 10 is operated. The directional coupler abstracts a sample of the transmission signal for frequency analysis, the remainder passing to an antenna switch 36, of which more later. The sampled signal is passed via a buffer amplifier 38 to a mixer 40 where it is down converted by means of a carrier-frequency signal from a local oscillator 42.

The down converted sample is digitised in an analogue to digital converter 44 and its frequency is measured by means of a digitally-tuned filter 45 controlled by a microprocessor 46. The measured frequency is communicated to a filter controller 48, which also is directed by the microprocessor 46.

The down converted frequency from the mixer 40 is selected to be compatible with the sampling rate and analogue bandwidth of the ADC 44. By down converting and sampling at a lower frequency, the power consumption and cost of the ADC 44 can be reduced. For example, down converting from an input RF frequency of 2.4 to 2.5 GHz to a frequency of 900 MHz enables the minimum sampling rate to be reduced from 5 GS/s to 1.8 GS/s.

Each antenna, here shown as antennas 18 and 20, is connected via its flexible lead 26 to a respective reception directional coupler 52. Received signals are sampled and the samples are sent separately via respective buffer amplifiers 54 to mixers 56 where they are down converted, again using a signal from local oscillator 42. The down converted signals are separately digitised by analogue to digital converter 58 and fed to respective tunable filters 60. These filters are set by the filter controller 48 to pass that component of the received signal frequency range which is equal to that of the transmitted signal measured by filter 45.

The strengths of the passed components of the received signals, being those which are in the channel which the radio is using, are measured and compared by a comparator 62 which determines which of them is the strongest. The comparator output on line A is fed to the antenna switch 36 as an instruction to select the antenna which has the strongest in-channel received signal and to connect it via the directional coupler 32 to the radio 10.

In operation of the apparatus 28, the sequence of events is as follows:

i) A user wishing to transmit makes an initial transmission identifying to whom he wishes to talk. Initially the transmit signal is divided between the multiple antennas 14, 16, 18, 20. This enables the transmission frequency to be identified by the filter 45 and the microprocessor 46 and the receive filters 60 are tuned to the correct frequency.

ii) A second user receiving the signal then transmits to confirm reception. The amplitudes of the signals received by the multiple antennas of the first user's radio are compared in comparator 62 and the antenna switch 36 commanded to switch to the antenna receiving the strongest signal.

iii) The first user then continues the communication by transmitting using the preferred antenna selected based on the strongest receive signal.

iv) The received signal level comparison will be repeated at the selected frequency each time the user releases his PTT switch, causing the transmission to cease and the radio to go into receive mode.

If the second user has a similarly equipped radio, that radio will initiate its antenna selection procedure at step (ii) above.

Preferably the apparatus 28 operates quickly enough for the antenna selection to have been completed or confirmed in the period (maybe half a second) after the initial transmit and receive cycle and in the subsequent pauses in the conversation when switching from transmit to receive. In that event, all subsequent transmission and reception is via the antenna selected for the time being. If this is not possible then until a selection command is received from the comparator 62, the antenna switch 36 behaves as a passive splitter/combiner. In that state it distributes the transmitted signal to all of the antennas, and combines all the received signals for delivery to the radio 10. At the end of a conversation, as determined by a timer (not shown) which checks if there is no transmitted signal at the detector 45, 46 for more than a defined period of time, the apparatus 28 reverts to a quiescent state in which the antenna switch 36 is non-selective and combines the received signals from all the antennas.

FIG. 4 shows an embodiment of the invention which may be more economical to implement than that of FIG. 3, by avoiding the need to digitise the sampled signals. Features corresponding to those in FIG. 3 have the same reference numerals.

In the FIG. 4 embodiment, the sampled transmission signal is buffered at 38 as in FIG. 3, and then divided by a directional coupler 70. Part of the sampled signal is passed to a transmission detector 72 which alerts the microprocessor 46. The remainder of the sampled signal is conditioned by a filter 74 and passed to a frequency measuring (zero-crossing) counter 76 which having been initialised by the alerted microprocessor 46, determines the frequency of the sampled transmission signal. The microprocessor 46 uses this data to instruct a variable-frequency voltage controlled oscillator 78 to output a local oscillator signal having a frequency which when mixed with the desired receive frequency down-converts the received signal to a predetermined fixed frequency, here 900 MHz. The desired receive frequency is the same as the transmit frequency if the radio is simplex or time-divided duplex. If the radio is full duplex, the desired receive frequency is a different frequency which has a predetermined relationship to the transmit frequency.

The VCO 78 provides its output frequency to the mixers 56, which down-convert the sampled received signals from the antenna to the fixed intermediate frequency 900 MHz signal, which is conditioned by precise fixed band/pass filters 80. These filters are less bulky and less expensive than the tunable filters of the FIG. 3 embodiment.

The amplitudes of the down-converted signals is detected by detectors 82 to provide a DC measure of the received signal strengths at the receive frequency of interest. The signal strengths are compared by the comparator 62 which instructs the antenna switch 36 as already described with reference to FIG. 3.

The transmission signal detector 72 also enables the microprocessor 46 to operate as a timer and to switch the antenna switch 36 to its non-selective state in the absence of a transmission signal for a predetermined period of time.

It will be appreciated from the foregoing that the described embodiments of the invention can at least improve the probability that a signal of adequate strength will be received by the radio even in difficult propagation conditions. In the embodiment employing active antenna selection, the most favourable antenna for reception is selected after the PTT switch is operated and the transmitter goes into receive mode. All described embodiments are capable of retro-fitting to existing radios without modification.

The invention also includes any novel feature or combination of features herein described, whether or not expressly claimed.

The invention claimed is:

1. Apparatus for providing antenna diversity for a radio transmitter/receiver comprising: a detector for detecting the frequency of a signal transmitted by the transmitter/receiver; a selector for selecting a frequency range according to the detected transmission frequency of the transmitter/receiver, a measuring unit for measuring relative received signal strengths in a plurality of antennas in the selected frequency range; and a switch for connecting the antenna having the greatest received signal strength to the transmitter/receiver.

2. Apparatus as in claim 1, wherein the detector is configured to detect the frequency of the transmitted signal when a press-to-talk switch or other transmission initiation switch of the transmitter/receiver is operated or otherwise upon commencement of transmission by the transmitter/receiver.

3. Apparatus as in claim 1, wherein the measuring unit comprises a tunable filter and controller responsive to the detector for setting the tunable filter to pass signals received by each antenna in a frequency range determined by the detected transmission frequency.

4. Apparatus as in claim 1, wherein the measuring unit comprises a tunable down-converter and controller responsive to the detector for setting the down-converter to down-convert to a common lower frequency signals received by each antenna in a frequency range determined by the detected transmission frequency.

5. Apparatus as in claim 4 wherein the tunable down-converter comprises a local oscillator unit for providing a common local oscillator signal for down-converting the received signal samples from all of the antennas.

6. Apparatus as in claim 3 wherein the measuring comprises a comparator for comparing the strengths of the passed received signals, for determining which is the greatest, and for providing an instruction to the switch as to which antenna is to be connected to the transmitter/receiver.

7. Apparatus as in claim 6 configured for use with a transmitter/receiver which transmits and receives on the same selectable frequency, the apparatus comprising a down-converter for down-converting the sample of the transmitted signal and the samples of the received signals using a common local oscillator.

8. Apparatus as in claim 1, being separate from the transmitter/receiver, the switch being configured for connection to an antenna port thereof.

9. A diversity antenna system comprising a plurality of antennas in combination with apparatus for providing antenna diversity for a radio transmitter/receiver comprising: a detector for detecting the frequency of a signal transmitted by the transmitter/receiver; a selector for selecting a frequency range according to the detected transmission frequency of the transmitter/receiver, a measuring unit for measuring relative received signal strengths in a plurality of antennas in the selected frequency range, and a switch for connecting the antenna having the greatest received signal strength to the transmitter/receiver.

10. A system as in claim 9 being for use with a personal transmitter/receiver, the antennas being configured to be disposed when in use so as to be spaced apart at different locations on a user's body.

11. A wearable antenna system for use with a personal radio transmitter/receiver, comprising a plurality of antennas flexibly connected to a common switch so as to be capable in use of being disposed at different spaced-apart locations on the wearer's body, the common switch being configured for connecting the antennas to the transmitter/receiver; a detector for detecting the frequency of a signal transmitted by the transmitter/receiver; a selector for selecting a frequency range according to the detected transmission frequency of the transmitter/receiver, a measuring unit for measuring relative received signal strengths in a plurality of antennas in the selected frequency range; and a switch for connecting the antenna having the greatest received signal strength to the transmitter/receiver.

12. A system as in claim 11 wherein the switch comprises a diversity selector for selecting the antenna which has the greatest received signal strength at the transmitter/receiver's reception frequency and for connecting it to the transmitter/receiver.

13. A system as in claim 10, wherein the antennas are incorporated into a garment to be worn by the user, or otherwise are linked together so as to be constrained to be disposed at said different locations on the user's body when in use.

14. A personal radio system comprising a transmitter/receiver in combination with an antenna system comprising a plurality of antennas in combination with apparatus for providing antenna diversity for a radio transmitter/receiver comprising: a detector for detecting the frequency of a signal transmitted by the transmitter/receiver; a selector for selecting a frequency range according to the detected transmission frequency of the transmitter/receiver, a measuring unit for measuring relative received signal strengths in a plurality of antennas in the selected frequency range and a switch for connecting the antenna having the greatest received signal strength to the transmitter/receiver, the antennas being configured to be disposed when in use so as to be spaced apart at different locations on a user's body.

15. An antenna diversity apparatus for a radio transmitter/receiver, the antenna diversity apparatus comprising:
   a detector for detecting the frequency of a signal transmitted by the transmitter/receiver;
   a selector for selecting a frequency range according to the detected transmission frequency of the transmitter/receiver,
   a measuring unit for measuring relative received signal strengths in a plurality of antennas in a selected frequency range,
   a switch for connecting the antenna having the greatest received signal strength to the transmitter/receiver,
   and a connector for connecting the antenna diversity apparatus to an output port of a radio transmitter/receiver.

* * * * *